July 3, 1923.
W. E. STANFORD
VEHICLE SPRING
Filed May 4, 1922
1,460,987
5 Sheets-Sheet 1
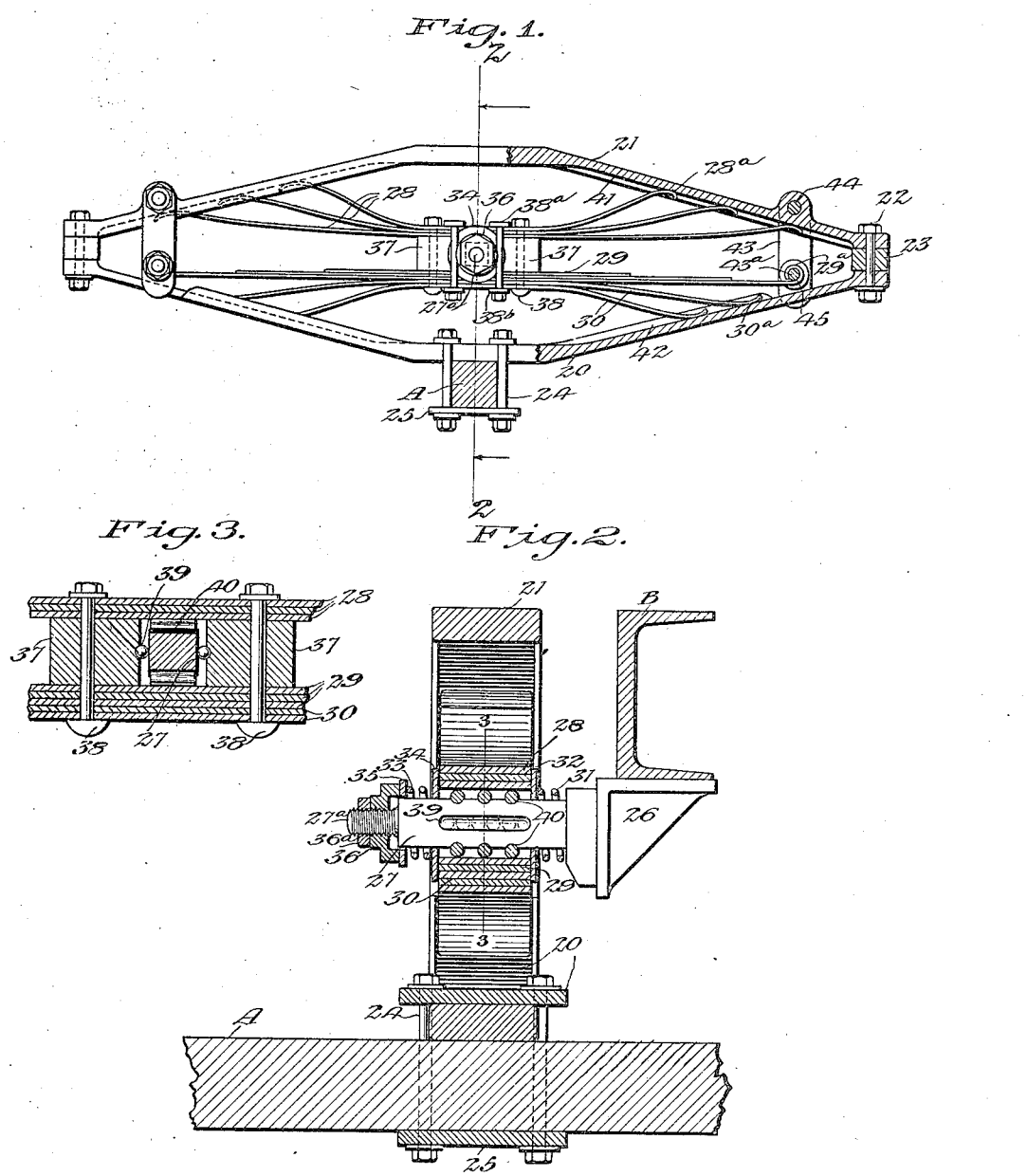

July 3, 1923.

W. E. STANFORD

VEHICLE SPRING

Filed May 4, 1922

WITNESSES

INVENTOR
W. E. STANFORD
BY
ATTORNEYS

July 3, 1923.

W. E. STANFORD

VEHICLE SPRING

Filed May 4, 1922

WITNESSES

INVENTOR
W. E. STANFORD

ATTORNEYS

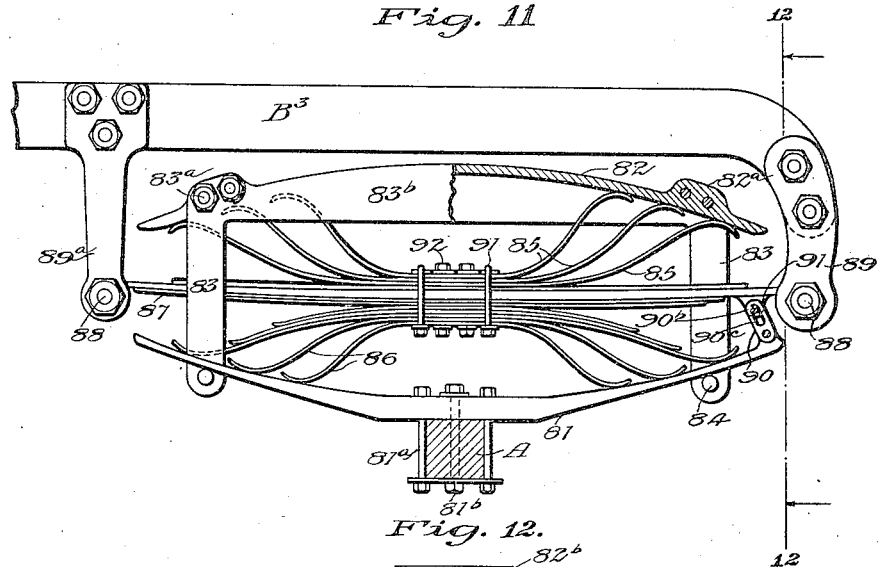
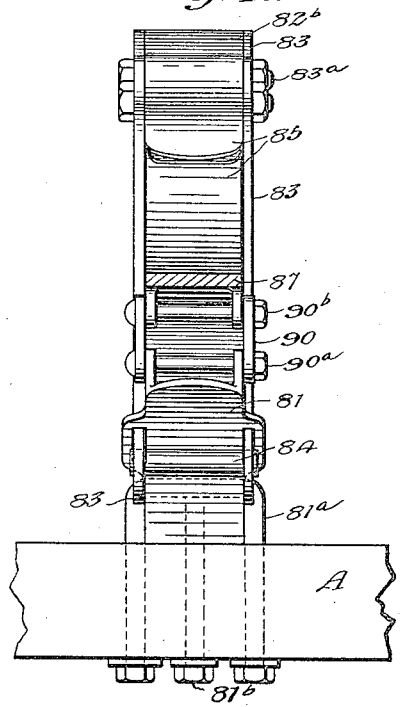

July 3, 1923.
W. E. STANFORD
VEHICLE SPRING
Filed May 4, 1922
1,460,987
5 Sheets-Sheet 5
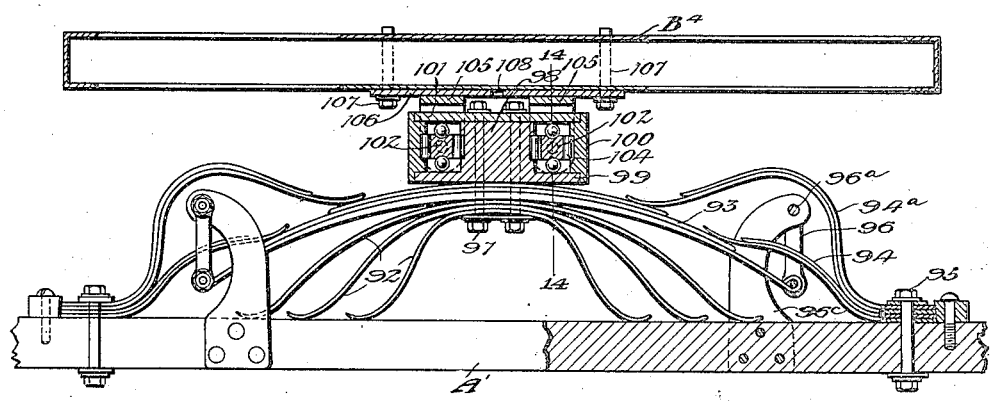
Fig. 13.
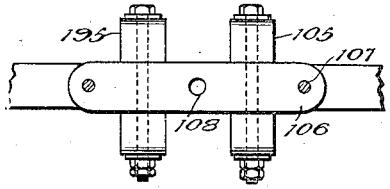
Fig. 15.
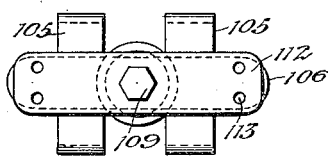
Fig. 16.
Fig. 17.
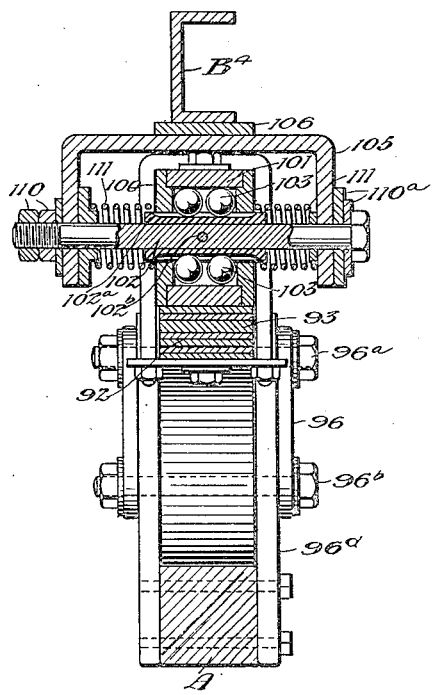
Fig. 14.
WITNESSES
INVENTOR
W. E. STANFORD
BY
ATTORNEYS Patented July 3, 1923.

1,460,987

UNITED STATES PATENT OFFICE.

WILL ELY STANFORD, OF CALEXICO, CALIFORNIA.

VEHICLE SPRING.

Application filed May 4, 1922. Serial No. 558,456.

*To all whom it may concern:*

Be it known that I, WILL E. STANFORD, a citizen of the United States, and a resident of Calexico, in the county of Imperial and State of California, have invented a new and Improved Vehicle Spring, of which the following is a description.

My invention relates to springs for automobiles and other vehicles and more particularly relates to a novel assemblage of leaf springs.

The general object of the invention is to provide a spring assemblage and appurtenances to afford the maximum resiliency and to constitute effective shock absorbers without the necessity of employing shock absorbers additional to the springs.

The manner in which the above object and others are attained will clearly appear as the description proceeds.

Reference is to be had to the accompanying drawings forming a part of this specification, it being understood that the drawings are merely illustrative of practical examples of the invention.

Figure 1 is a partly sectional side elevation of a side spring for vehicles embodying my invention;

Figure 2 is a transverse vertical section as indicated by the line 2—2, Figure 1;

Figure 3 is a detail in vertical section in a plane at right angles to Figure 2 as indicated by the line 3—3 of Figure 2;

Figure 11 is an end view of the side spring assemblage modified in particulars hereinafter explained;

Figure 12 is a transverse vertical section on an enlarged scale on the line 12—12, Figure 11, but with the chassis bar omitted;

Figure 13 is a view partly in section and partly in elevation showing an embodiment of the invention in a transverse front or rear spring;

Figure 14 is an enlarged vertical section as indicated by the line 14—14 in Figure 13;

Figure 15 is a plan view of features of the assemblage employed in the embodiment shown in Figures 13 and 14;

Figure 16 is a vertical section of some of the features shown in Figure 15 and additions adapted for use in a wagon;

Figure 17 is a plan view of the features shown in Figure 16.

Figure 4:
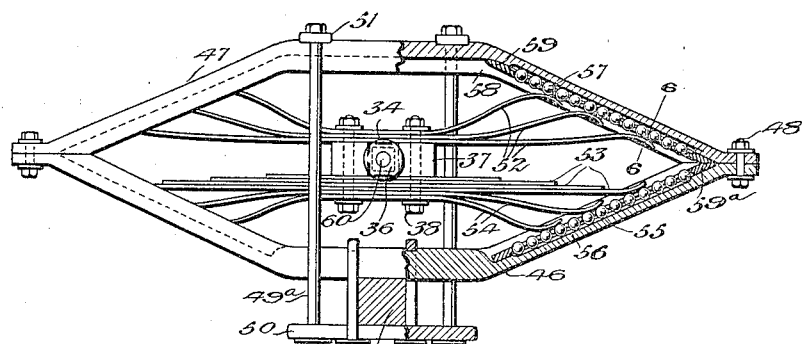
Figure 4 is a view similar to Figure 1 but showing a modification.

Referring at first to the form of the invention illustrated in Figures 1 to 3, an elliptic frame is provided composed of a bottom bar 20 and top bar 21 enclosing the spring assemblage hereinafter referred to, the convergent ends of said bars being secured by vertical bolts 22, there being spacers 23 employed on said bolts between the bars. The lower frame bar 20 is suitably clamped to the vehicle axle A as by bolts 24 and bar washers 25.

The side bar B of the chassis frame is sustained on a bracket 26 projecting from which is a horizontal arm 27 extending transversely between the bars 20, 21 between an upper series of curved leaf springs 28 and a composite spring assemblage comprising intermediate flat leaf springs 29 and lower curved springs 30, said springs being more particularly referred to hereinafter. A spring 31 is coiled about the arm 27 adjacent the bracket 26 and abuts at one end against said bracket, said spring at the outer end exerting its pressure against the washer 32 overlapping the inner side surfaces of the springs 28, 29, 30. A second spring 33 is coiled about the arm 27 and abuts at its inner end against the washer 34 at the outside of the springs 28, 29, 30 and abuts at its outer end against a washer 35. The outer end 27ᵃ of arm 27 is reduced and theaded to receive a nut 36 bearing against the washer 35. A lock nut 36ᵃ may also be employed outside of nut 36 as indicated in Figure 2.

The arm 27 extends between blocks 37 disposed between springs 28, 29, said blocks being secured by bolts 38. Between the arm 27 and the blocks 37 rollers 39 are provided for slight end play between the said arm and said blocks. Also, between the arm 27 and the springs 28, 29 roller bearings 40 are provided.

The springs 28 are leaf springs of curved form and divergent at their outer ends leaving clear space between the respective leaves of the series. The terminals of the leaf springs 28 are curved downwardly as at 28$^a$ and are adapted to have play in longitudinal grooves 41 at the under side of the top bar 21. The intermediate leaf springs 29 are flat while the bottom leaf springs 37 are curved and flare toward their outer ends similarly to the springs 28, the curved terminals 30$^a$ of said springs being permitted sliding movement in grooves 42 in the upper surface of the bottom bar 20. Each end of the lowermost leaf spring of the series of springs 29 is turned as at 29$^a$ about a pin 43$^a$ on a hanger bar 43 which is pivoted at its upper end as at 44 to the top bar 21.

Figure 6:
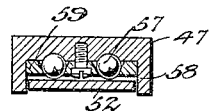
Figure 6 is a detail in section on the line 6—6, Figure 4.
Figure 5:
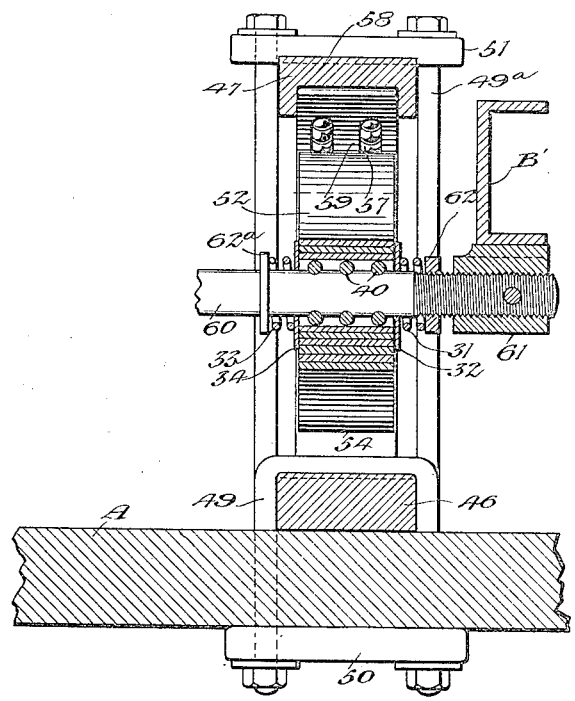
Figure 5 is a view similar to Figure 2 but showing the assemblage of Figure 4.
Figure 7:
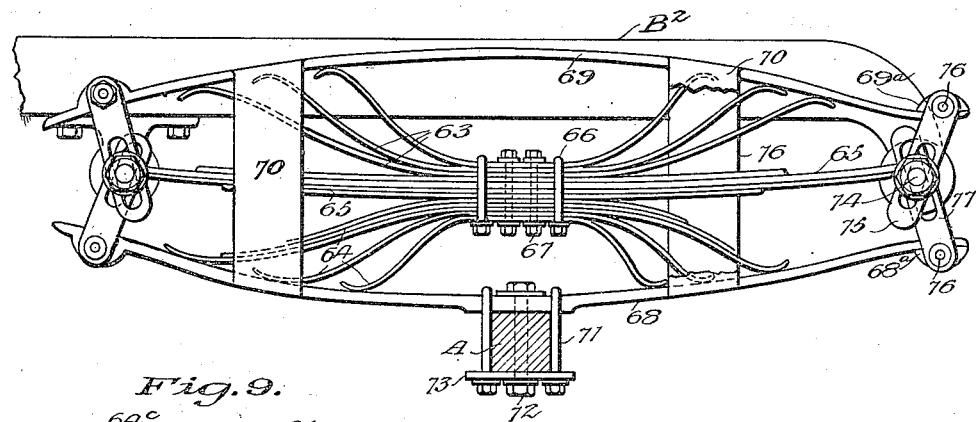
Figure 7 is a side elevation of another modification of the invention as embodied in a side spring, the axle being shown in cross section.

In the form of the invention shown in Figures 4 to 6 a generally elliptical frame for the springs is provided, said frame comprising a bottom bar 46 and a top bar 47 corresponding generally with the frame bars 20 and 21 and having their convergent ends secured by bolts 48.

The axle A is secured by shackles 49 passing through a bar washer 50, there being in addition vertical bolts 49$^a$ at the sides of the frame connecting said bar washer 50 with the cross bars 51 and the top member 47 of the frame.

Within the frame composed of bars 46, 47 an upper series of curved springs 52 is provided and a lower series of curved springs 54 together with an intermediate series of flat springs 53. Said springs correspond generally with the springs 28, 29, 30. The curved terminals of the lower springs 54 as well as the curved terminal of the lowermost flat spring 53 bear against longitudinal series of bearing balls 55 in the channel 56 in the lower bar 46. Similarly, the curved surface of the curved springs 52 bear against balls 57 in the channel 58 in the top bar 47. The balls 57 are set in an insert 59 in the channel 58 and a similar insert 59$^a$ being provided for the balls 55.

To support the chassis side bar B' a bracket 61 is provided on a lateral arm 60 corresponding generally with the arm 27. On the arms 60 are collars 62, 62$^a$ at opposite sides of the spring assemblage, against which coil springs 31, 33 bear. The latter springs correspond with those previously described as do also the elements 34, 36, 37, 38 and 40.

In the form shown in Figures 7 to 10 the chassis side bars B$^2$ have support at an end thereof at one end of the spring assemblage which comprises an upper series of curved springs 63 and a lower series of curved springs 64, the springs of both of said series being divergent at their outer free ends as with the similar springs previously described and there is an intermediate series of springs 65 in close relation, the series being slightly bowed. All the springs of all the series are clamped together by shackles 66 and intermediate vertical bolts 67. The springs are within a frame comprising a bowed bottom bar 68 and a reversely bowed top bar 69, said bars being connected rigidly by vertical side bars 70 integral with said bars 68, 69. The axle A is clipped to the bottom bar 68 by shackles 71 and an intermediate vertical bolt 72 is passed through a bar washer 73 beneath the axle.

It will be understood that spring assemblages such as described are provided at each side of the vehicle and these are connected by a transverse rod 74 passing through links 75 disposed at each side of the spring assemblage, said links being pivoted at one end as by pins 76, respectively, to lugs 68$^a$, 69$^a$ on the frame bars 68, 69, said links overlapping and being slotted as at 77 for the passage of the rod 74, connection being completed by nuts 74$^a$ and washers 74$^b$.

Figure 8:
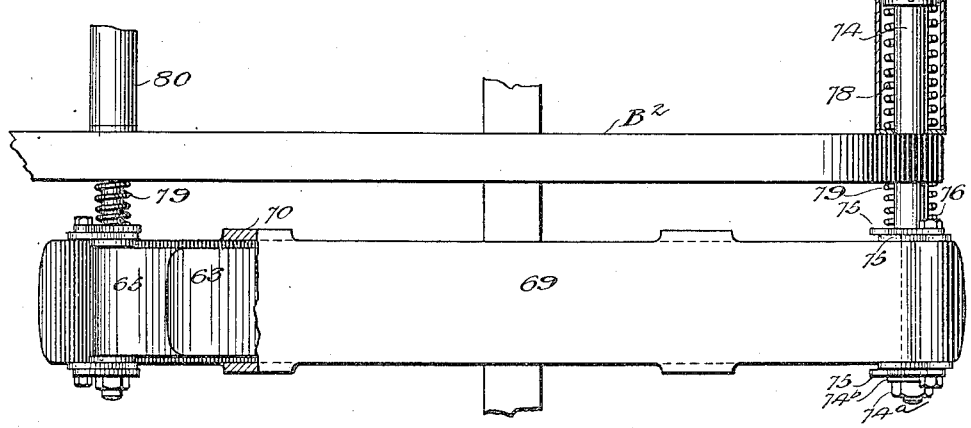
Figure 8 is a plan view of the assemblage shown in Figure 7.

Springs 78 are coiled about the rod 74, said springs abutting at one end against the chassis bar B$^2$. Additional springs 79 on the rod 74 between the spring assemblage and chassis bar at one end against the chassis bar and at the opposite end against the links 75. The rod 74 and the springs 78 are provided with a housing 80. In Figure 8, the housing 80, rod 74, and springs 78, 79 are shown in section and are shown enlarged in the interest of clearness.

Figure 9:
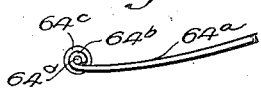
Figure 9 is a fragmentary side elevation showing a modified form of the terminal ends of the curved springs.
Figure 10:
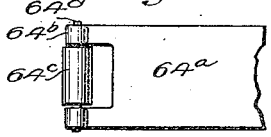
Figure 10 is a plan view of the modification shown in Figure 9.

The terminal ends of the springs 63 and 64 may have anti-friction rollers as indicated in Figures 9 and 10 in which a terminal of a spring designated 64$^a$ is forked and has the ends of the fork members turned over as at 64$^b$ about a pin 64$^d$ carrying the anti-friction roller 64$^c$ in the fork of the spring.

In the form shown in Figures 11 and 12 a support for the chassis bar B$^3$ is provided at both ends of the spring assemblage. In said Figures 11 and 12 a bottom bar 81 is provided approximating semi-cylindrical form and a reversely disposed curved top bar 82. Secured to the top bar by bolts 83$^a$ are depending members 83 at the sides of the spring assemblage, said depending members having lateral studs 84 extending beneath the bottom frame bar 81 of the spring assemblage. The depending members 83 are integral with a side bar 83$^b$ provided at each side of the top bar 82 and form with the latter a channel for the ends of the upper series of springs.

The spring assemblage includes upper curved springs 85, a lower series of curved springs 86, and an intermediate series of leaf springs 87 lying in close relation, the longest leaf of the series of springs 87 having eyes as is customary with vehicle springs over pins 88 passing respectively through depending members 89 at the end of the chassis bar 83$^b$ and through members 89$^a$ distant from the member 89. Connection between the bottom frame bar 81 at one end of the latter and one of the springs 87 is effected through the medium of a link 90 having a slot and pin connection with lugs 91 on said spring 87, there being shown a pin 90$^b$ passing through a slot 90$^c$ in the link 90 and through the lugs 91.

Referring to Figures 13 to 17 the axle A' supports a spring assemblage including lower curved springs 92, the curved terminals of which bear on said axle, a semi-elliptic leaf spring 93 and two groups of end springs 94, 94$^a$ secured by bolts 95 of the axle and curving laterally inward to bear at different points on members of the spring 93. The longest of the leaf springs 93 have connection with depending links 96 pivotally secured at their upper ends as at 96$^a$ to standards 96$^c$ rigid with the axle A', the lower ends of the springs 96 having pins 96$^b$ about which the end of one of the leaves of the spring 93 is turned. The springs 92, 93 are secured by vertical bolts 97 to a block 98 having bottom flanges 99 formed with side elements 100 and a top cap 101 and transverse passages for bolts or rods 102 corresponding in function with the arms 27. At the top and bottom of the rods 102 ball bearings 103 may be provided and at the sides of said bars roller bearings 104 are advantageously employed. The rods 102 pass through the downturned legs or flanges of U-shaped saddles 105. As one means for a convenient assemblage of the parts the central portion of the rod 102 may be in the form of a sleeve 102$^a$ secured by a pin 102$^b$. Nuts 110 and washers 110$^a$ are shown associated with the rod or bolt 102. Springs 111 coiled about the rod 102 within the saddle 105 press against the side members 100. In employing the invention in connection with automobiles as in Figures 13 to 15, the saddles 105 carry a cross plate 106 which extends beyond the saddles and is secured by vertical bolts 107 to the chassis bar B$^4$. In practice, the plate 106 is formed centrally with a vertical hole 108 so that the assemblage including the plate 106 may be employed in a wagon, the hole 108 receiving a king pin 109, said pin passing also through an element 112 pertaining to the fifth wheel organism of a wagon, said element 112 having bolt holes 113 for securing it to the under side of a wagon bolster, (not shown).

I would state in conclusion that while the illustrated examples constitute practical embodiment of my invention, I do not limit myself strictly to the exact details herein illustrated, since, manifestly, the same can be considerably varied without departure from the spirit of the invention as defined in the appended claims.

Having thus described my invention, I claim:

1. A vehicle spring comprising a series of spring leaves divergent toward their ends, means to take the thrust of said springs at said ends, and a second series of springs comprising leaves in close relation over substantially their complete area, said second series of springs disposed at that face of the first series opposite the divergent ends of said first series.

2. In a spring assemblage, a series of spring leaves, upper and lower frame bars between which said leaves are disposed and subject to pressure of said spring leaves at the top and bottom, means to secure the lower frame bar to an axle, and means to sustain the members of a vehicle frame on said spring.

3. A spring assemblage including top and bottom bars, upper and lower series of spring leaves divergent toward their ends bearing respectively against said stop and bottom bars, an intermediate series of spring leaves, and means to mount the bottom bar on an axle, and means to support vehicle frame parts subject to the tension of said leaves.

4. A spring assemblage including top and bottom bars, upper and lower series of spring leaves divergent toward their ends bearing respectively against said top and bottom bars, an intermediate series of spring leaves, means to mount the bottom bar on an axle, and means to support vehicle frame parts subject to the tension of said leaves; together with means connecting said bottom bar with a leaf of the intermediate series.

5. A spring assemblage including top and bottom bars, upper and lower series of spring leaves divergent toward their ends bearing respectively against said top and bottom bars, an intermediate series of spring leaves, means to mount the bottom bar on an axle, and means to support vehicle frame parts subject to the tension of said leaves; together with overlapping slotted links pivotally secured to the top and bottom bars respectively and transverse pins extending through the slots of said links and connected with one of the leaves of the intermediate series.

6. A spring assemblage including top and bottom bars, upper and lower series of spring leaves divergent toward their ends bearing respectively against said top and bottom bars, an intermediate series of spring leaves, means to mount the bottom bar on an axle, and means to support vehicle frame parts subject to the tension of said leaves, the upper series of leaves exerting pressure at their ends against said top bar and the intermediate and lower series of springs exerting pressure on said bottom bar.

7. A spring assemblage including top and bottom bars, upper and lower series of spring leaves divergent toward their ends bearing respectively against said top and bottom bars, an intermediate series of spring leaves, means to mount the bottom bar on an axle, and means to support vehicle frame parts subject to the tension of said leaves; together with means connecting said bottom bar with a leaf of the intermediate series, and depending elements rigid with the top bar and presenting lateral pins extending beneath the bottom bar.

8. In a spring assemblage including semi-elliptic top and bottom bars secured together, an upper series of spring leaves exerting pressure at their ends against the under side of the top bar, a lower series of spring leaves exerting pressure against the bottom bar, an intermediate series of spring leaves, means to sustain vehicle frame parts on said spring leaves, means to connect the lower bar with an axle, and depending members on the top bar to which a leaf of the intermediate series is connected.

9. In a vehicle spring, a series of downwardly curving spring leaves divergent toward their ends, a second series of down-curved leaves above the first series, the leaves of the second series being in close relation throughout, an axle against which the first series of leaves exerts pressure, a connection between the second series of leaves and members rigid with the axle, means to mount vehicle frame parts subject to the tension of the two series of leaves, and additional series of spring leaves secured to said axle and overlapping the second series of leaves.

WILL ELY STANFORD.